United States Patent
Grippo

(10) Patent No.: US 7,628,894 B2
(45) Date of Patent: Dec. 8, 2009

(54) PROCESS FOR MANUFACTURING A CERAMIC ELEMENT FOR A WATCH CASE AND ELEMENT OBTAINED BY THIS PROCESS

(75) Inventor: Eric Grippo, Geneva (CH)

(73) Assignee: Rolex S.A., Geneva (CH)

( * ) Notice: Subject to any disclaimer, the term of this patent is extended or adjusted under 35 U.S.C. 154(b) by 163 days.

(21) Appl. No.: 11/061,289

(22) Filed: Feb. 18, 2005

(65) Prior Publication Data

US 2006/0011471 A1      Jan. 19, 2006

(51) Int. Cl.
*C23C 14/35* (2006.01)

(52) U.S. Cl. .............. 204/192.15; 204/192.12; 204/192.16

(58) Field of Classification Search ............ 204/192.12, 204/192.15, 192.16
See application file for complete search history.

(56) References Cited

U.S. PATENT DOCUMENTS

| | | | | |
|---|---|---|---|---|
| 3,911,670 A | * | 10/1975 | Hofer | 368/280 |
| 4,213,840 A | * | 7/1980 | Omori et al. | 438/571 |
| 4,512,863 A | * | 4/1985 | Criss et al. | 204/192.15 |
| 4,565,616 A | * | 1/1986 | Kenworthy et al. | 204/192.26 |
| 4,973,388 A | * | 11/1990 | Francois et al. | 205/186 |
| 5,022,978 A | * | 6/1991 | Hensel et al. | 204/298.19 |
| 5,157,258 A | * | 10/1992 | Gunning et al. | 250/339.02 |
| 5,331,608 A | * | 7/1994 | Umemoto et al. | 368/10 |
| 5,358,597 A | | 10/1994 | Smith | |
| 5,972,233 A | * | 10/1999 | Becker et al. | 216/28 |
| 6,714,485 B2 | * | 3/2004 | Albisetti et al. | 368/27 |

FOREIGN PATENT DOCUMENTS

| | | |
|---|---|---|
| CH | 636238 | 5/1983 |
| DE | 2533524 | 7/1975 |
| EP | 230853 | 8/1987 |
| EP | 566820 | 10/1993 |
| JP | 55-135769 | 10/1980 |
| JP | 55-141569 | * 11/1980 |
| JP | 2001-010070 | * 1/2001 |

* cited by examiner

*Primary Examiner*—Rodney G McDonald
(74) *Attorney, Agent, or Firm*—Westerman, Hattori, Daniels & Adrian, LLP

(57) ABSTRACT

According to this process for manufacturing a ceramic element intended to be fitted onto a watch case, the visible surface of which has features, a soluble layer is selectively deposited on said visible surface, the thickness of said soluble layer being at least equal to the height of said features, a first tie layer of the Ti, Ta, Cr or Th type is vacuum-deposited by magnetron sputtering with a thickness of at least 100 nm by physical vapor deposition (PVD) on said surface thus selectively coated, followed, without venting atmosphere, by PVD deposition of said second layer made of Au, Pt, Ag, Ni, Pd, TiN, CrN, ZrN or alloys thereof with a thickness of at least 100 nm, and then said soluble layer is dissolved.

13 Claims, 2 Drawing Sheets

PROCESS FOR MANUFACTURING A CERAMIC ELEMENT FOR A WATCH CASE AND ELEMENT OBTAINED BY THIS PROCESS

CROSS REFERENCE TO RELATED APPLICATIONS

This application is claims priority of European Application No. 03405924.6 filed Dec. 23, 2003, which is included in its entirety by reference made hereto.

BACKGROUND OF THE INVENTION

1. Field of the Invention

The present invention relates to a process for manufacturing a ceramic element intended to be fitted onto a watch case, the visible surface of which includes features, and also to a ceramic element obtained by this process.

2. Description of Related Art

A process has already been proposed, in DE 2 533 524 and in EP 0 230 853, for depositing a metalized layer on a ceramic substrate that consists in depositing a CuO or Ti first layer with a thickness of at least 100 nm followed by a copper, silver, gold or nickel second layer. The adhesion between the two layers is obtained by passage through a furnace. In the case of copper and CuO, the temperature of the furnace must be between the CuO eutectic and the melting point of copper, i.e. between 1068° and 1078° C., which temperature is completely incompatible with the use of a photosensitive resin or photoresist, so that such processes do not allow the mask to be retained for the purpose of a subsequent electroforming operation.

Given that these processes do not allow the use of photosensitive materials, using techniques widely employed in the fabrication of electronic components in particular, it therefore cannot be used to actively grow features, such as digits, by electroforming since such masks would not withstand the temperature of the furnace treatment for bonding the layers.

Also proposed, in CH 636 238, is a process for forming symbols on watch parts made of an electrically non-conducting material, on which a metal layer, such as a Cr layer, is vacuum-deposited, this metal layer is covered with a photoresist in which apertures corresponding to the shape of the symbols have been formed, and a layer of a second metal, such as Au, Ni Rh, Va, is deposited electrochemically on the first metal layer through the apertures made in the layer of photoresist. Next, the resist is dissolved and then the first metal layer is chemically etched until the substrate reappears.

The main drawback of this approach stems from the fact that the chemical etching used to remove the first layer causes corrosion of the second layer. Furthermore, the deposition of the first layer by vacuum evaporation does not make it possible to achieve sufficient adhesion to form features on a watch case part, such as a watch bezel. This is because the abovementioned document proposes the formation of symbols on a watch case is protected by a watch glass, which is not the case with the bezel, which constitutes the most exposed part of the watch case. Symbols fitted onto a watch case bezel are therefore not protected, so that the process according to CH 636 238 does not allow symbols to be fixed onto a bezel with sufficient adhesion.

The object of the present invention is to remedy, at least partly, the abovementioned drawbacks.

BRIEF SUMMARY OF THE INVENTION

For this purpose, the subject of the invention is firstly a process for manufacturing a ceramic element intended to be fitted onto a watch case, the visible surface of which has features, as claimed in claim 1. Next, the subject of the invention is a ceramic element as claimed in claim 5.

The essential advantage of this invention is that it allows selective formation of features, without any shape limitation, giving rise to a novel product, offering novel esthetic possibilities and making it possible to renew and improve the appearance of watches, in particular the appearance of watches having fixed and rotary bezels.

The process according to the present invention makes it possible to achieve excellent adhesion of the raised features to the surface of the ceramic element, this being of great importance, above all when the features are raised features since a wrist watch case in particular is very exposed to all kinds of external attack, especially to being knocked.

Advantageously, the visible surface on which the features are formed is a frustoconical or frustopyramidal surface that consequently requires a particular masking technique.

Other particular aspects and advantages will become apparent over the course of the description that follows, this being given with reference to the appended drawings that illustrate, schematically and by way of example, one method of implementing the process forming the subject of the present invention and a variant thereof, and also the ceramic elements obtained by this process.

BRIEF DESCRIPTION OF THE DRAWINGS

FIG. 1 illustrates a sintered substrate 1 made of $ZrO_2$, $Al_2O_3$ or a mixture of the two, on the surface of which a layer 2 of a photosensitive polymer or photoresist is deposited for the purpose of forming a conformal layer for the selective deposition of the features. The thickness of this layer 2 depends on the method of implementation used to form the features, according to whether these will be substantially surface features or raised features.

DETAILED DESCRIPTION OF THE INVENTION

Figure 1:
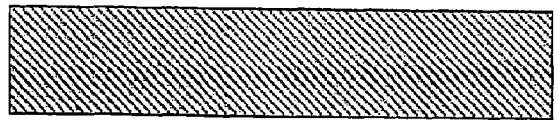
FIGS. 1 to 4 illustrate various phases in the process for producing a ceramic element, seen in cross section, intended to be fitted onto a watch case, according to the present invention.
Figure 2:
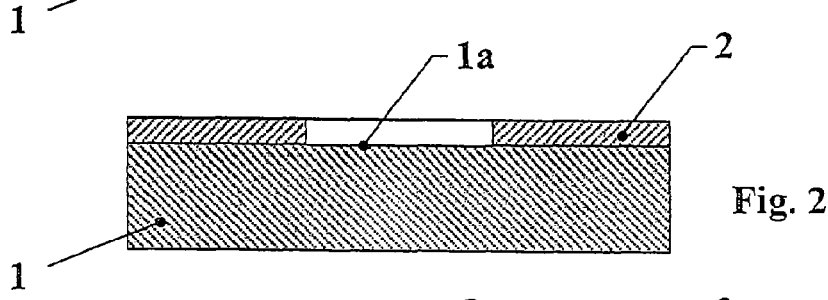
Figure 3:
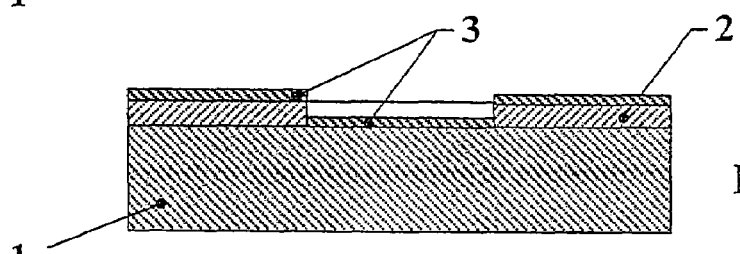

A mask is applied to this layer 2 of photoresist, of the RISTON® MM150 type, so as to selectively irradiate this layer 2 with UV light in order to cure those parts of the layer 2 of photoresist that have to remain on the substrate 1. This layer 2 is then developed in a 0.85% $Na_2CO_3$ bath according to the indications provided by the photoresist supplier, in order to dissolve the unirradiated parts of the layer 2 in order to bare surface portions 1a of the substrate 1. These portions have the shapes chosen for forming the features, as illustrated by FIG. 2. This operating method corresponds to a standard photolithographic process.

It should be pointed out that in the illustrated examples, the substrate 1 shown in cross section by FIGS. 1 to 7 corresponds in fact to a portion of the ceramic element according to the present invention. This portion may especially correspond to a radial section of this ceramic element consisting of a circular ring of rectangular cross section. Preferably, this ring has a frustoconical shape so that the visible surface 1a is inclined relative to the axis of revolution of this ring.

For this reason, the mask used to form the features in the polymer layer 2 is not a conventional mask, but a polymer mask that has been thermoformed in order to give it a shape complementary to that of the ceramic substrate. This polymer mask, which has a certain degree of flexibility, is applied to the layer 2 with sufficient pressure for it to conform to this layer 2 over its entire area.

Once this operation of forming the features has been carried out, the substrate 1 thus selectively coated by the layer 2 is placed in a vacuum coating chamber in which a first tie layer 3 is deposited (FIG. 3) by the technique of PVD (physical vapor deposition) with magnetron sputtering, which makes it possible to ensure greater adhesion of the tie layer 3 than would be obtained using the PVD technique without a magnetron. Furthermore, thanks to the magnetron sputtering, the temperature of the substrate 1 may be kept low, well below 100° C., during the deposition operation. It is thanks to the use of this deposition technique that it is possible to deposit the tie layer on the substrate 1 selectively coated with the polymer layer 2 and to ensure excellent adhesion of this tie layer 3 for the substrate 1, without having to carry out a heat treatment at a temperature liable to destroy the polymer.

While still maintaining a vacuum in the deposition chamber, a second layer 4 is formed (FIG. 4) by magnetron sputtering using a target of the Au, Ag, Pt, Pd, TiN, CrN or Ni type. The thickness of this second layer is greater then 500 nm and preferably between 500 nm and 15 μm.

The equipment used to carry out the vacuum deposition by magnetron sputtering comprises:
- a cylindrical stainless steel chamber with a turbomolecular pumping system and a rotary vane pump;
- a substrate holder of the carousel type having a vertical rotation axis and vertically positioned substrates, and the possibility of carrying out biased RF sputtering on the substrate holder;
- two vertical rectangular magnetron cathodes mounted so as to face the carousel at an angle of 120° relative to the axis of the carousel;
- two cathodes, namely a $Ti_{99.99}$ target and an $Au_{99.99}$ target;
- a supply for the cathodes, by means of an RF (13.56 MHz) 600 W generator with a manual impedance-matching box;
- a gas feed (purity: 5.7-6.0) via a mass flowmeter; and
- pressure monitoring by a Penning gauge, for monitoring the limiting vacuum and by a capacitive gauge (absolute measurement) for monitoring the working pressure.

The parts are cleaned in an ultrasonic bath with a 20% isopropyl alcohol/80% deionized water mixture for five minutes and then dried with a nitrogen gun.

The substrates are stripped by placing the chamber under vacuum, pumping down to a pressure of less than $5 \times 10^{-2}$ Pa. An ion cleaning operation is carried out on the surface of the substrates by reverse sputtering:
- RF power on the substrate holder: >100 W;
- argon flow rate: >15 cm³/min;
- oxygen flow rate: >5 cm³/min;
- total pressure: <5 Pa; and
- duration: 20-30 minutes.

The titanium sublayer deposition conditions are the following:
- RF power on the cathode: >150 W;
- argon flow rate: >5 cm³/min;
- argon pressure: <5 Pa; and
- thickness of the layer: >100 nm, preferably >100 nm and <1500 nm.

While still maintaining vacuum in the chamber, the substrates are moved, by rotation of the carousel, toward a small cathode equipped with the $Au_{99.99}$ target. The deposition conditions are the following:
- RF power on the cathode: >50 W;
- argon flow rate: >10 cm³/min;
- argon pressure: <5 Pa; and
- thickness of the layer: at least >100 nm, preferably >500 nm and <15 μm.

Figure 4:
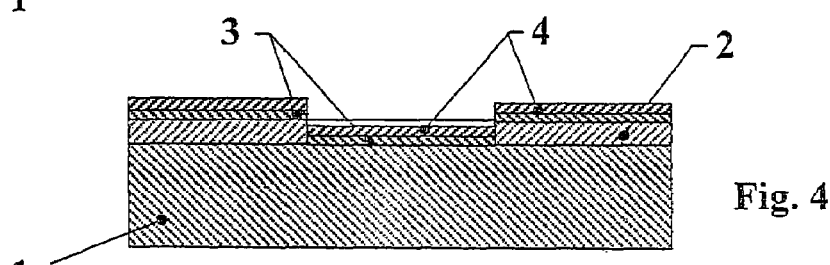

The substrates thus obtained are entirely coated with the titanium tie layer, which is itself coated with the gold layer, as illustrated by FIG. 4.

After this second layer 4 has been deposited, the substrate is removed from the vacuum deposition chamber and the choice of two solutions made.

According to a first method of implementation, the substrate 1 selectively coated with the polymer layer 2 and with the layers 3 and 4 (FIG. 4) is subjected to an electroforming operation using the same noble metal as that used for the second layer 4, in this example, gold. The entire advantage of the invention lies in the possibility of keeping the polymer mask intact for its use in the subsequent selective electroforming operation. An additional layer 5 is therefore deposited with the desired thickness by electroforming. The gold bath used in this case has a high Au content and allows electroforming with a layer of at least 0.10 mm, preferably a few tenths of a millimeter, in thickness. The operating conditions for the electroforming process are those indicated by the suppliers of the electroforming bath. The duration of the process depends on the thickness of the layer deposited. The rate of growth of the deposit is about 10 μm/h.

Figure 5:
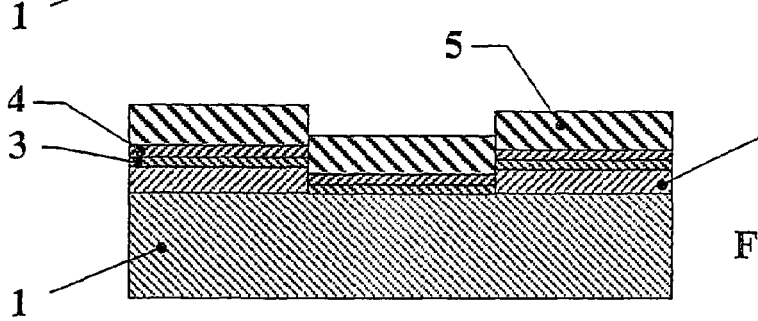
FIGS. 5 and 6 illustrate one embodiment of the raised features.
Figure 6:
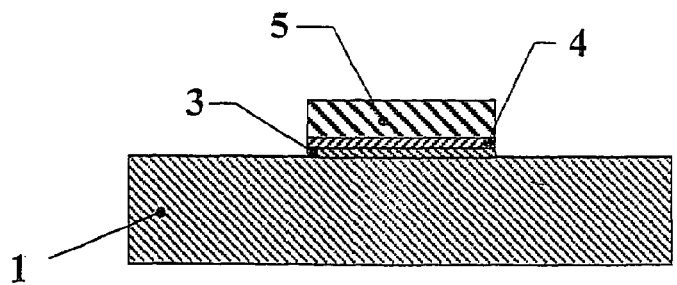
Figure 7:
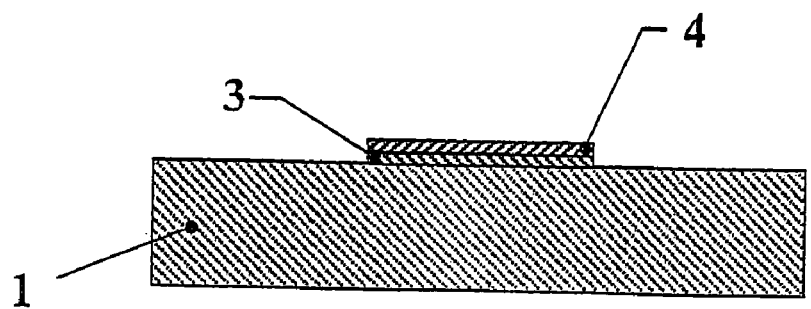
FIG. 7 illustrates a variant for obtaining the features on the surface of the ceramic element.

According to a second method of implementation illustrated by FIG. 7, after the substrate selectively coated with the layers 3 and 4 has been removed, the polymer layer 2 is dissolved, as was carried out previously in order to pass from the step shown in FIG. 5 to that shown in FIG. 6, in such a way that only the layers 3 and 4 that were on the parts 1a where the ceramic substrate was not covered by the dissolved polymer layer 2 remain on the substrate 1. In this case, owing to the thickness of the layers 3, 4, the features are practically flush with the surface of the substrate 1.

As a variant, the ceramic element according to the present invention, instead of being in the form of a frustoconical ring could be in the form of a polygonal frame with a face inclined to the central axis of this element, thus constituting a truncated pyramid.

Figure 8:
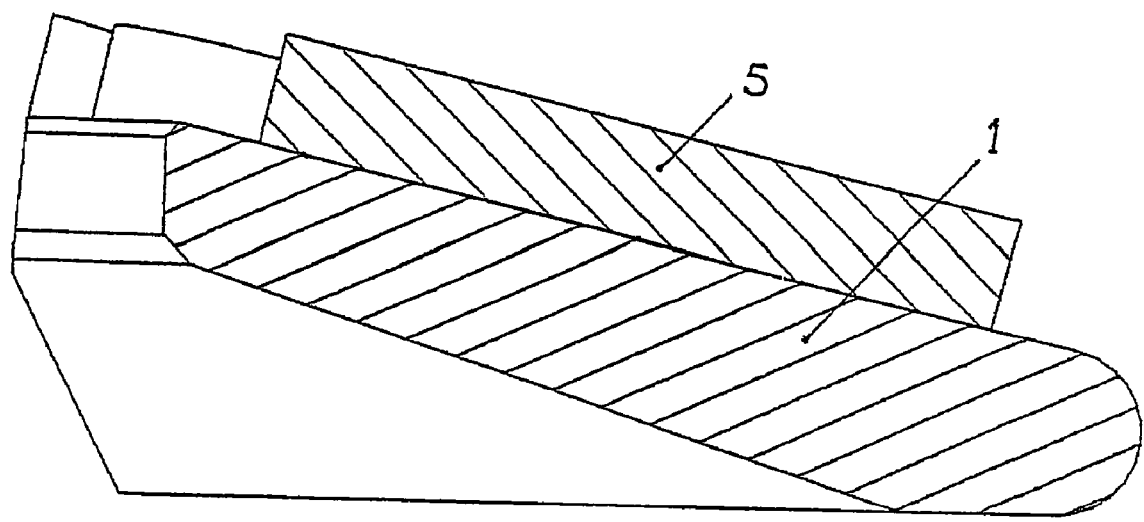
FIG. 8 is a partial sectional view of a ceramic ring for a bezel, according to the present invention.

FIG. 8 illustrates a ceramic ring 1 of frustoconical shape that is intended to be fitted by elastic deformation onto a bezel. This ring 1 is provided with raised features 5 according to the embodiment shown in FIG. 5.

The invention claimed is:

1. A process for manufacturing a ceramic element to be fitted onto a watch case, a visible surface of which has features, wherein said visible surface is a watch surface exposed to being knocked, said process comprising:
   selectively depositing a photoresist layer on said visible surface, the thickness of said photoresist layer being at least equal to the height of said features,
   vacuum-depositing a first tie layer made of Ti, Ta, Cr, Th or alloys thereof by physical vapor deposition (PYD) with magnetron sputtering with a thickness of at least 100 nm on said surface thus selectively coated and maintained at a temperature below 100° C. at which said photoresist layer is kept intact, then, without venting atmosphere, depositing by PVD deposition a second layer made of Au, Pt, Ag, Ni, Pd, TiN, CrN, ZrN or alloys thereof with a thickness of at least 100 nm, and then dissolving said photoresist layer, so as to obtain the features on the visible surface of the ceramic element.

2. The process as claimed in claim 1, in which, before said photoresist layer is dissolved, an additional layer of a noble metal or an alloy of noble metals is deposited by electroforming.

3. The process as claimed in claim 1, in which a thermoplastic polymer mask produced by thermoforming is applied to said photoresist layer deposited on said visible surface which has a frustoconical of frustopyramidal shape.

4. The process as claimed in claim 1, wherein the first tie layer has a thickness ranging from 100 nm to 1500 nm.

5. The process as claimed in claim 1, wherein the second layer has a thickness ranging from 500 nm to 15 μm.

6. The process as claimed in claim 4, wherein the second layer has a thickness ranging from 500 nm to 15 μm.

7. The process as claimed in claim 3, in which said visible surface is vertically positioned while rotated around a vertical axis during the vacuum deposition by physical vapor deposition (PYD) with magnetron sputtering.

8. The process as claimed in claim 1, wherein the photoresist layer has a thickness between >0.5 and 15 μm.

9. The process as claimed in claim 1, wherein the ceramic element is made of sintered ceramic.

10. The process as claimed in claim 9, wherein the ceramic substrate is made of $ZrO_2$, $Al_2O_3$, or a mixture of $ZrO_2$ and $Al_2O_3$.

11. The process as claimed in claim 9, wherein the ceramic element is fitted onto a watch case and the watch case is assembled into a watch such that the features on the visible surface of the ceramic element are exposed to being knocked.

12. The process as claimed in claim 10, wherein the ceramic element is fitted onto a watch case and the watch case is assembled into a watch such that the features on the visible surface of the ceramic element are exposed to being knocked.

13. The process as claimed in claim 1, wherein the ceramic element is fitted onto a watch case and the watch case is assembled into a watch such that the features on the visible surface of the ceramic element are exposed to being knocked.

* * * * *